(12) United States Patent
Danner et al.

(10) Patent No.: US 7,561,263 B2
(45) Date of Patent: Jul. 14, 2009

(54) APPARATUS FOR ILLUMINATING AND INSPECTING A SURFACE

(75) Inventors: Lambert Danner, Wetzlar (DE);
Michael Heiden, Woelfershelm (DE);
Alexander Buettner, Wetzlar (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 218 days.

(21) Appl. No.: 11/644,275

(22) Filed: Dec. 22, 2006

(65) Prior Publication Data

US 2007/0159700 A1 Jul. 12, 2007

(30) Foreign Application Priority Data

Jan. 10, 2006 (DE) .................. 10 2006 001 435

(51) Int. Cl.
*G01N 21/00* (2006.01)
(52) U.S. Cl. ................. 356/237.4; 356/237.5
(58) Field of Classification Search ... 356/237.1–237.6; 355/67; 353/28–30; 359/619, 621, 741; 362/268, 311
See application file for complete search history.

(56) References Cited

U.S. PATENT DOCUMENTS 4,733,944 A 3/1988 Fahlen et al.
5,594,526 A 1/1997 Mori et al.
7,265,816 B2 * 9/2007 Tsuji ........................... 355/71
7,304,730 B2 * 12/2007 Inoue et al. .............. 356/237.1
2005/0001900 A1 1/2005 Kreh et al.
2005/0031974 A1 2/2005 Fukuhara

FOREIGN PATENT DOCUMENTS

DE 100 62 579 6/2001
DE 103 30 006 2/2005

* cited by examiner

*Primary Examiner*—Gregory J Toatley, Jr.
*Assistant Examiner*—Tri T Ton
(74) *Attorney, Agent, or Firm*—Simpson & Simpson, PLLC

(57) ABSTRACT

The present invention relates to an apparatus for illuminating and inspecting a specular surface, comprising a light source, a collector optics for collecting the light from the light source, a homogenizing optics for transmitting the light from the collector optics having a first micro-lens array downstream of the collector optics, and a second micro-lens array downstream of the first micro-lens array, a Fourier optics for transmitting the light from the homogenizing optics onto the specular surface, an objective optics, and a detector for receiving an image, wherein the collector optics and the first micro-lens array project the light source onto the second micro-lens array and wherein the second micro-lens array and the Fourier optics project the first micro-lens array onto the specular surface, and wherein the objective optics projects the specular surface onto the detector.

15 Claims, 2 Drawing Sheets

APPARATUS FOR ILLUMINATING AND INSPECTING A SURFACE

CROSS REFERENCE TO RELATED APPLICATIONS

This application claims priority of German Patent Application No. 10 2006 001 435.9, filed Jan. 10, 2006, which application is incorporated herein by reference.

FIELD OF THE INVENTION

The present invention relates to an apparatus for illuminating a surface and to an apparatus for inspecting a specular surface, such as of a wafer.

BACKGROUND OF THE INVENTION

For wafer inspection an illuminating intensity which is as high as possible is desirable while maintaining homogeneousness to the highest degree. The high intensity is necessary to increase wafer throughput with the shortest possible exposure times. The homogeneousness of illumination is necessary because when the images are evaluated they are compared with each other. Differences in the comparisons are evaluated as defects. Inhomogeneous illumination would therefore falsely indicate a defect.

SUMMARY OF THE INVENTION

It is therefore an object of the present invention to provide an apparatus for illuminating and inspecting a surface with high efficiency and homogeneousness of the illumination.

The object is fulfilled by an apparatus comprising:
a light source,
a collector optics for collecting the light from the light source,
a homogenizing optics for transmitting the light from the collector optics having a first micro-lens array downstream of the collector optics,
a second micro-lens array downstream of the first micro-lens array,
a Fourier optics for transmitting the light from the homogenizing optics onto the specular surface,
an objective optics,
a detector for recording an image, and
wherein the collector optics and the first micro-lens array project the light source onto the second micro-lens array, and wherein the second micro-lens array and the Fourier optics project the first micro-lens array onto the specular surface, and wherein the objective optics projects the specular surface onto the detector.

Additionally the object is fulfilled by an apparatus comprising:
a light source,
a collector optics for collecting the light from the light source,
a homogenizing optics for transmitting the light from the collector optics having a first micro-lens array downstream of the collector optics,
a second micro-lens array downstream of the first micro-lens array,
a Fourier optics for transmitting the light from the homogenizing optics onto the surface, wherein the collector optics and the first micro-lens array project the light source onto the second micro-lens array, and wherein the second micro-lens array and the Fourier optics project the first micro-lens array onto the surface.

Advantageous embodiments of the invention are defined in the dependent claims.

The basic idea of the invention is that the near-field distribution of the light source is homogenized by overlapping the images.

According to the present invention the object is solved by an apparatus for inspecting a specular surface, comprising a light source, a collector optics for collecting the light from the light source, a homogenizing optics for transmitting the light from the collector optics with a first micro-lens array downstream of the collector optics, and a second micro-lens array downstream of the first micro-lens array, and a Fourier optics for transmitting the light from the homogenizing optics onto the specular surface, an objective optics and a detector for receiving an image, wherein the collector optics and the first micro-lens array project the light source onto the second micro-lens array, wherein the second micro-lens array and the Fourier optics project the first micro-lens array onto the specular surface and wherein the objective optics projects the specular surface onto the detector.

Moreover, the object is achieved by an apparatus for illuminating a surface, comprising a light source, a collector optics for collecting the light from the light source, a homogenizing optics for transmitting the light from the collector optics with a first micro-lens array downstream of the collector optics, and a second micro-lens array downstream of the first micro-lens array, and a Fourier optics for transmitting the light from the homogenizing optics onto the surface, wherein the collector optics and the first micro-lens array project the light source onto the second micro-lens array, and wherein the second micro-lens array and the Fourier optics project the micro-lens array onto the surface.

BRIEF DESCRIPTION OF THE DRAWINGS

The invention will be described in more detail in the following with reference to the schematic representations of an exemplary embodiment. The same reference numerals refer to the same elements throughout the drawing figures, in which.

DETAILED DESCRIPTION OF THE INVENTION

Figure 1:
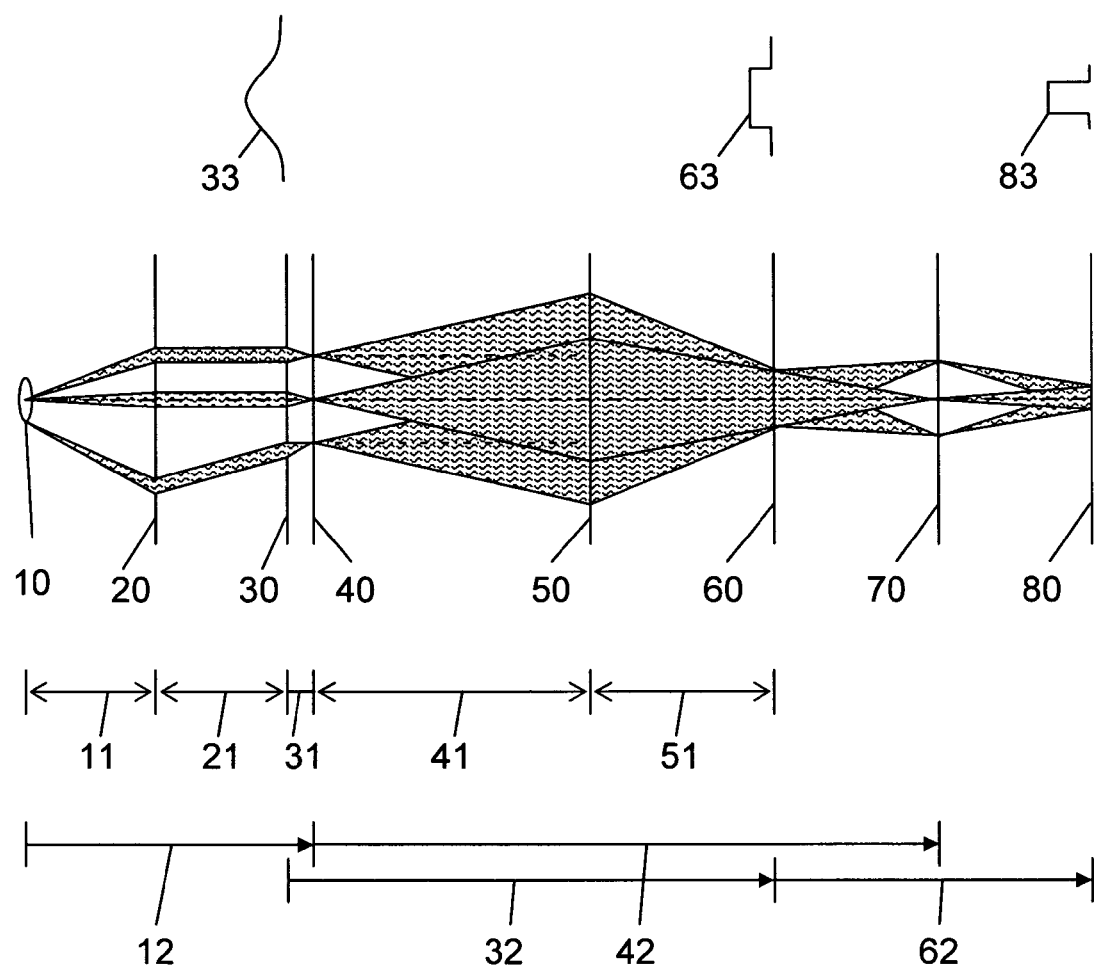
FIG. 1 illustrates an apparatus for inspecting a specular surface.

FIG. 1 shows an apparatus for inspecting a specular surface with light source 10, collector optics 20, a homogenizing optics including first micro-lens array 30 and second micro-lens array 40, Fourier optics 50, with specular surface 60 to be inspected, objective optics 70 and detector 80. The beam path is shown as continuous on specular surface 60 for clarity.

Light source 10 is formed by the output surface of a fiber-optic bundle. Other point-like light sources are also conceivable. The light is generated by a flash lamp with a reflector and coupled into the fiber-optic bundle.

Collector optics 20 is disposed at a distance 11 of its focal length from light source 10.

First micro-lens array 30 of the homogenizing optics is disposed at a distance 21 of the focal length of the collector optics from the latter. A bell shaped intensity distribution 33 is formed on the input surface of the first micro-lens array.

The micro lenses of the two micro-lens arrays have essentially the same focal length. The second micro-lens array 40 is disposed at a distance 31 of the focal length of the micro lenses from the first micro-lens array. Collector optics 20 and first micro-lens array 30, in an image 12, project light source 10 onto second micro-lens array 40.

Fourier optics 50 is at a distance 41 greater than its focal length from second micro-lens array 40. Fourier optics 50 is composed of two identical plano-convex lenses having their curvatures face each other. Second micro-lens array 40 and Fourier optics 50, in an image 32, project first micro-lens array 30 onto specular surface 60.

Specular surface 60 can be represented, for example, by a wafer to be inspected. A translucent surface or plate is also conceivable, so that the beam is radiated not to be reflected, but to be transmitted as shown for clarity. Specular surface 60 is at a distance 51 of the focal length of Fourier optics 50 from the latter. A cup-shaped intensity distribution 63 is formed on the specular surface. The light dot of the intensity distribution has a size of about 40 mm by 40 mm. Fourier optics 50 and specular surface 60 project second micro-lens array 40 onto objective optics 70 in a second image 42. Imaging onto the input pupil of objective optics 70 is suitable.

Objective optics 70 is not telecentric on the side of the object. The objective should only be telecentric on the side of the object if the illumination is telecentric, too. Objective optics 70, in an image 62, projects specular surface 60 onto detector 80 at a reduction of 1:6.5. A cup-shaped intensity distribution 83 is formed in detector 80. The detector is a 2d-array surface detector, such as a CCD.

Figure 2:
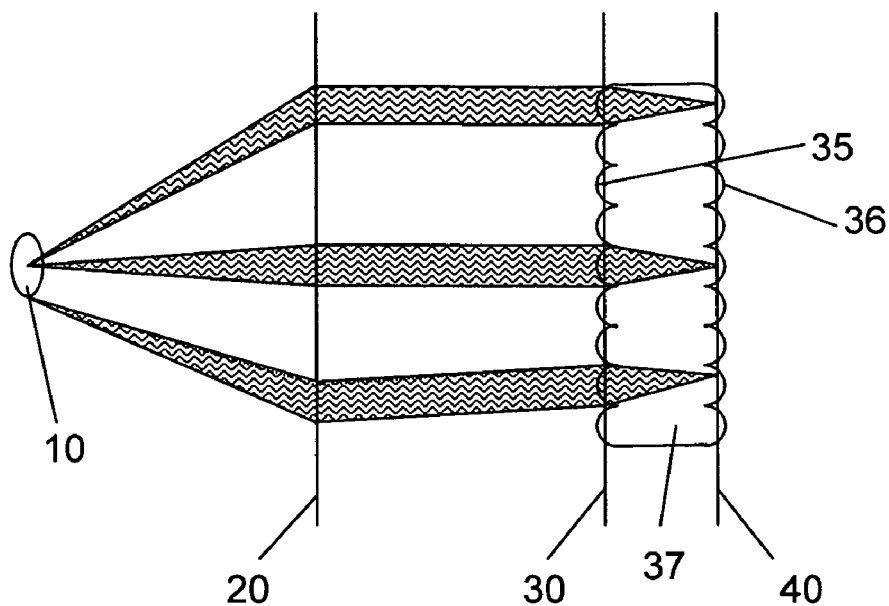
FIG. 2 illustrates an apparatus for illuminating a surface as a detail in FIG. 1; and, FIG. 3 shows an alternative to FIG. 2.

FIG. 2 shows a light source 10, collector optics 20 and the homogenizing optics with first micro-lens array 30 and second micro-lens array 40. The two micro-lens arrays are combined in a double array in a single component. They are formed here as a cushion from the opposite surfaces of a plate. The micro lenses are curved toward the outside on the plate surface. The distance of the micro lenses in each array is about ⅒ of their focal length. The individual lenses 35 of the first micro-lens array 30 and the individual lenses 36 of the second micro-lens array 40 are arranged facing each other without being offset.

Figure 3:
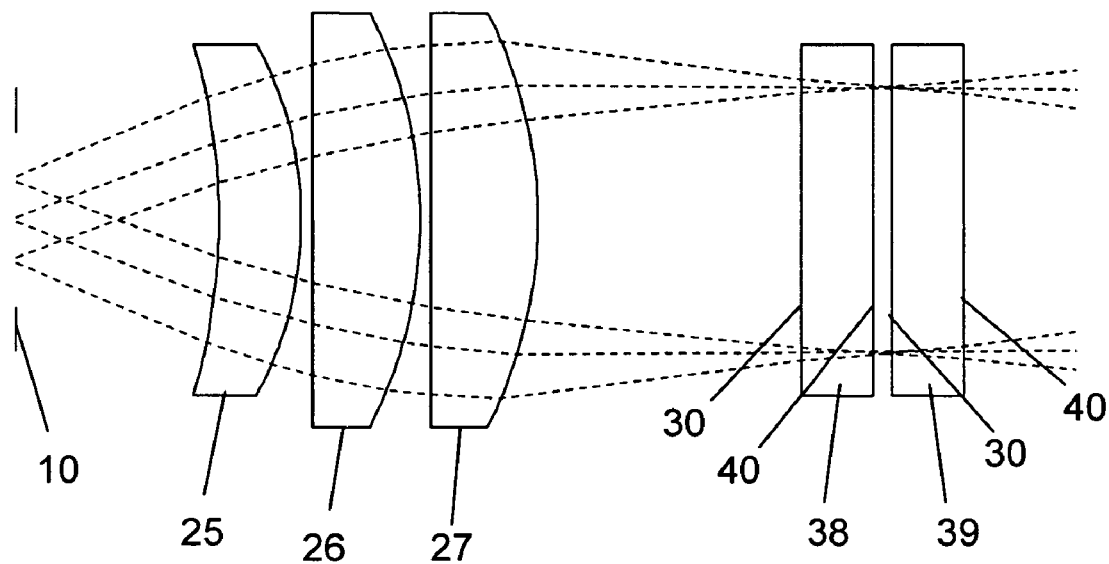

FIG. 3 shows an alternative embodiment to FIG. 2. Collector optics 20 is composed of a first lens 25, a second lens 26 and a third lens 27. The homogenizing optics is formed here, as an alternative, by a first double array 38 and a second double array 39 each having a first micro-lens array 30 and a second micro-lens array 40. Micro-lens arrays 30 and 40 of double arrays 38 and 39 are cylindrical micro-lens arrays. The cylindrical micro lenses and the micro-lens arrays of each double array are arranged facing each other in parallel and without being offset. Double arrays 38 and 39 have the alignment of their cylindrical lenses crossed and arranged at a small distance from each other.

The gaps between the individual micro lenses are suitably covered.

Light source 10, collector optics 20, the homogenizing optics and the Fourier optics form the apparatus for illuminating a surface.

The arrangements shown achieve an extremely uniform and high-intensity distribution on the surface to be inspected for the apparatus for illuminating as well as in the detector for the apparatus for inspection.

What is claimed is:

1. An apparatus for inspecting a specular surface, comprising:

a light source;

a collector optics for collecting the light from the light source;

a homogenizing optics for transmitting the light from the collector optics having a first micro-lens array downstream of the collector optics;

a second micro-lens array downstream of the first micro-lens array;

a Fourier optics for transmitting the light from the homogenizing optics onto the specular surface;

an objective optics;

a detector for recording an image; and wherein the collector optics and the first micro-lens array project the light source onto the second micro-lens array, and wherein the second micro-lens array and the Fourier optics project the first micro-lens array onto the specular surface, and wherein the objective optics projects the specular surface onto the detector, the Fourier optics is arranged at a distance greater than its focal length downstream of the homogenizing optics and in that the objective optics is not telecentric on the side of an object.

2. The apparatus according to claim 1, wherein the Fourier optics projects the second micro-lens array onto the input pupil of the objective optics via the specular surface.

3. The apparatus according to claim 1, wherein the objective optics projects the surface at a reduction of 1:6.5.

4. An apparatus for illuminating a surface, comprising:

a light source;

a collector optics for collecting the light from the light source;

a homogenizing optics for transmitting the light from the collector optics having a first micro-lens array downstream of the collector optics;

a second micro-lens array downstream of the first micro-lens array;

a Fourier optics for transmitting the light from the homogenizing optics onto the surface; and, wherein the collector optics and the first micro-lens array project the light source onto the second micro-lens array, and wherein the second micro-lens array and the Fourier optics project the first micro-lens array onto the surface, wherein the first micro-lens array is arranged at a distance of the focal length of the collector optics downstream of the collector optics and wherein the second micro-lens array is arranged at a distance of the focal length of the micro lenses downstream of the first micro-lens array in parallel.

5. The apparatus according to claim 4, wherein the collector optics is arranged at a distance of its focal length from the light source.

6. The apparatus according to claim 4, wherein the focal length of the micro lenses of the micro-lens array is between 1 mm and 4 mm.

7. The apparatus according to claim 4, wherein the distance of the micro lenses of the micro-lens array is between ¹⁄₂₀ and ⅕ of their focal lengths.

8. The apparatus according to claim 4, wherein the second micro-lens array is equal to the first micro-lens array.

9. The apparatus according to claim 4, wherein the second micro-lens array is arranged with its lenses parallel and not offset with respect to the lenses of the first micro-lens array.

10. The apparatus according to claim 4, wherein the first micro-lens array and the second micro-lens array are configured as an integral double array having the lens curvatures face outside.

11. The apparatus according to claim 4, wherein the first micro-lens array and the second micro-lens array are provided with cushion-shaped lenses.

12. The apparatus according to claim 4, wherein the first micro-lens array and the second micro-lens array are configured with cylindrical lenses and have two crossed micro-lens pairs, wherein the first micro-lens pair is of a first and a second micro-lens array with parallel and non-offset associated cylindrical lenses, and the second micro-lens pair is of a third and fourth micro-lens array with parallel non-offset associated cylindrical lenses.

13. The apparatus according to claim 4, wherein the Fourier optics is at a distance of its focal length upstream of the surface.

14. The apparatus according to claim 4, wherein the Fourier optics consists of two identical plano-convex lenses having their curvatures face each other.

15. The apparatus according to claim 4, wherein the micro-lens array and the Fourier optics project a light dot of about 40 mm by 40 mm.

* * * * *